(12) United States Patent
Kanai

(10) Patent No.: US 12,334,994 B2
(45) Date of Patent: Jun. 17, 2025

(54) CONTROL APPARATUS, CONTROL SYSTEM, CONTROL METHOD, AND NON-TRANSITORY COMPUTER READABLE MEDIUM

(71) Applicant: NEC Corporation, Tokyo (JP)

(72) Inventor: Taiki Kanai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/579,931

(22) PCT Filed: Sep. 22, 2021

(86) PCT No.: PCT/JP2021/034827
§ 371 (c)(1),
(2) Date: Jan. 17, 2024

(87) PCT Pub. No.: WO2023/047490
PCT Pub. Date: Mar. 30, 2023

(65) Prior Publication Data
US 2024/0322858 A1 Sep. 26, 2024

(51) Int. Cl.
*H04B 3/46* (2015.01)
*H04B 3/60* (2006.01)
*H02G 9/00* (2006.01)

(52) U.S. Cl.
CPC .......... *H04B 3/46* (2013.01); *H04B 3/60* (2013.01); *H02G 9/00* (2013.01)

(58) Field of Classification Search
CPC .......... H04B 3/46; H04B 10/071; H04B 3/60; H04B 2210/074; H04B 3/48; H04B 10/07
See application file for complete search history.

(56) References Cited

U.S. PATENT DOCUMENTS

2007/0231072 A1* 10/2007 Jennings ................. F03B 13/10
405/75
2012/0155857 A1* 6/2012 Wang ................. H04B 10/0771
398/16
(Continued)

FOREIGN PATENT DOCUMENTS

| JP | 2000-268689 A | 9/2000 |
|----|---------------|--------|
| WO | 2021/044993 A1 | 3/2021 |
| WO | 2021/049099 A1 | 3/2021 |

OTHER PUBLICATIONS

International Search Report for PCT Application No. PCT/JP2021/034827, mailed on Dec. 21, 2021.

*Primary Examiner* — Khanh C Tran
(74) *Attorney, Agent, or Firm* — Sughrue Mion, PLLC

(57) ABSTRACT

An object of the present disclosure is to provide a control apparatus by which interference between signals can be avoided. A control apparatus (10) according to the present disclosure includes: an instruction unit (11) that instructs a monitoring apparatus to perform processing for monitoring a submarine cable; and a control unit (12) that controls a submarine device connected to the submarine cable. The monitoring apparatus, in response to the instruction given by the instruction unit (11), sends a monitoring signal into the submarine cable and performs the monitoring processing, and the control unit (12) detects a timing at which the monitoring processing is not being executed, and then sends a control signal into the submarine cable and controls the submarine device.

10 Claims, 6 Drawing Sheets

(56) References Cited

U.S. PATENT DOCUMENTS

2012/0182023 A1* 7/2012 Zhang ................ G01M 11/3109
324/501
2022/0006524 A1* 1/2022 Nakano .............. H04B 10/0795

* cited by examiner

CONTROL APPARATUS, CONTROL SYSTEM, CONTROL METHOD, AND NON-TRANSITORY COMPUTER READABLE MEDIUM

This application is a National Stage Entry of PCT/JP2021/034827 filed on Sep. 22, 2021, the contents of all of which are incorporated herein by reference, in their entirety.

TECHNICAL FIELD

The present disclosure relates to a control apparatus, a control system, a control method, and a non-transitory computer readable medium.

BACKGROUND ART

Technologies for transmitting a plurality of optical signals at timings different from each other are known. As the related art, for example, Patent Literature 1 discloses a photoelectric sensor system including a master station, a plurality of sensor stations including photoelectric sensors and communication means, and a communication line sequentially routed from the master station to each of the sensor stations. In this photoelectric sensor system, the master station includes transmission control means for transmitting a communication control signal. Further, each of the sensor stations includes operation control means for giving light emission timings different from each other to the photoelectric sensors based on the communication control signal.

CITATION LIST

Patent Literature

Patent Literature 1: Japanese Unexamined Patent Application Publication No. 2000-268689

SUMMARY OF INVENTION

Technical Problem

As another related art, a monitoring system for monitoring a failure status of a submarine cable laid on the bottom of the sea will be considered. It is assumed that the monitoring system includes a monitoring apparatus that monitors a submarine cable, a submarine device connected to the submarine cable, and a control apparatus that controls the submarine device. The submarine device is installed at the bottom of the sea, and the monitoring apparatus and the control apparatus are installed on the ground. The monitoring apparatus sends a monitoring signal for monitoring the submarine cable into the submarine cable, and performs processing for monitoring the submarine cable. Further, the control apparatus sends a control signal for controlling the submarine device into the submarine cable, and performs processing for controlling the submarine device connected to the submarine cable.

Note that, when the monitoring apparatus and the control apparatus starts the monitoring processing and the control processing, respectively, at a certain timing, the monitoring signal and the control signal are transmitted into the submarine cable at the same timing, and there is a risk that these signals may interfere with each other. In order to avoid this interference, the monitoring apparatus and the control apparatus are caused to start the monitoring processing and the control processing, respectively, at timings different from each other using the technology disclosed in Patent Literature 1. In this case, for example, the control processing may be started while the monitoring processing is being executed. As a result, the monitoring signal and the control signal may interfere with each other and affect each of the functions of the monitoring apparatus and the control apparatus.

The present disclosure has been made in view of the above-described circumstances and an object thereof is to provide a control apparatus, a control system, a control method, and a non-transitory computer readable medium by which interference between signals can be avoided.

Solution to Problem

A control apparatus according to the present disclosure includes:
  instruction means for instructing a monitoring apparatus to perform processing for monitoring a submarine cable; and
  control means for controlling a submarine device connected to the submarine cable, in which
  the monitoring apparatus, in response to the instruction given by the instruction means, sends a monitoring signal into the submarine cable and performs the monitoring processing, and
  the control means detects a timing at which the monitoring processing is not being executed, and then sends a control signal into the submarine cable and controls the submarine device.

A control system according to the present disclosure is a control system including:
  a monitoring apparatus; and
  a control apparatus, in which
  the control apparatus includes:
    instruction means for instructing the monitoring apparatus to perform processing for monitoring a submarine cable; and
    control means for controlling a submarine device connected to the submarine cable,
  the monitoring apparatus, in response to the instruction given by the instruction means, sends a monitoring signal into the submarine cable and performs the monitoring processing, and
  the control means detects a timing at which the monitoring processing is not being executed, and then sends a control signal into the submarine cable and controls the submarine device.

A control method according to the present disclosure includes:
  instructing a monitoring apparatus to perform processing for monitoring a submarine cable; and
  controlling a submarine device connected to the submarine cable, in which
  the monitoring apparatus, in response to the instruction given to the monitoring apparatus, sends a monitoring signal into the submarine cable and performs the monitoring processing, and
  in the controlling of the submarine device, a timing at which the monitoring processing is not being executed is detected, and then a control signal is sent into the submarine cable and the submarine device is controlled.

A non-transitory computer readable medium storing a control program according to the present disclosure causes a computer of a control apparatus to:

instruct a monitoring apparatus to perform processing for monitoring a submarine cable; and
control a submarine device connected to the submarine cable, in which
the monitoring apparatus, in response to the instruction given by the control apparatus, sends a monitoring signal into the submarine cable and performs the monitoring processing, and
in the controlling of the submarine device, a timing at which the monitoring processing is not being executed is detected, and then a control signal is sent into the submarine cable and the submarine device is controlled.

Advantageous Effects of Invention

According to the present disclosure, it is possible to provide a control apparatus, a control system, a control method, and a program by which interference between signals can be avoided.

EXAMPLE EMBODIMENT

First Example Embodiment

Figure 1:
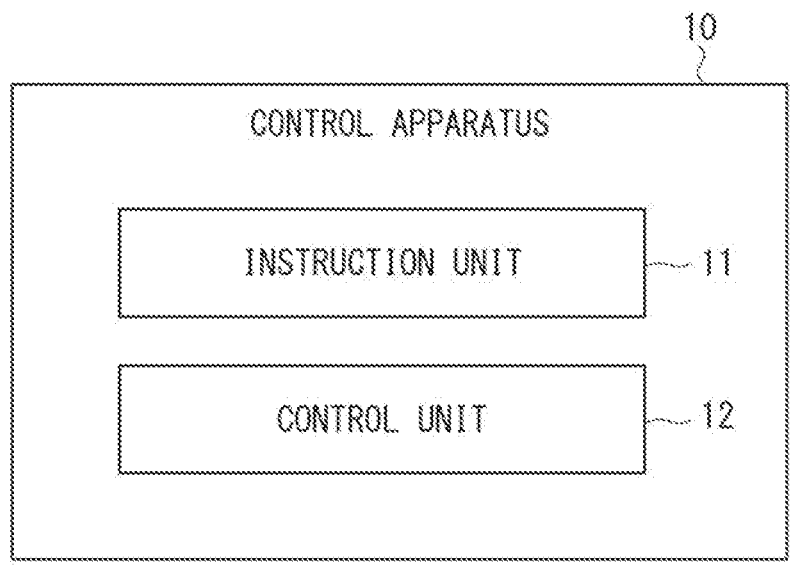
FIG. 1 is a block diagram showing a configuration of a control apparatus according to a first example embodiment.

This example embodiment will be described hereinafter with reference to the drawings.
FIG. 1 is a block diagram showing a configuration of a control apparatus according to this example embodiment.
The control apparatus 10 includes an instruction unit 11 that instructs a monitoring apparatus to perform processing for monitoring a submarine cable, and a control unit 12 that controls a submarine device connected to the submarine cable. The monitoring apparatus is an apparatus that sends a monitoring signal into the submarine cable and performs the monitoring processing in response to an instruction given by the instruction unit 11. The control unit 12 detects the timing at which the monitoring processing is not being executed in the monitoring apparatus, and then sends a control signal into the submarine cable and controls the submarine device.
In the control apparatus 10 according to this example embodiment, the instruction unit 11 instructs the monitoring apparatus to perform processing for monitoring a submarine cable, and the monitoring apparatus performs this processing in response to the instruction. The monitoring apparatus monitors a failure status of the submarine cable by sending a monitoring signal into the submarine cable. Further, when the monitoring processing performed by the monitoring apparatus is ended, the control unit 12 sends a control signal to the submarine cable and controls the submarine device.
In this way, the monitoring signal and the control signal are sent into the submarine cable at timings different from each other. Therefore, by the control apparatus 10 according to this example embodiment, interference between the monitoring signal and the control signal can be avoided.

Second Example Embodiment

Figure 2:
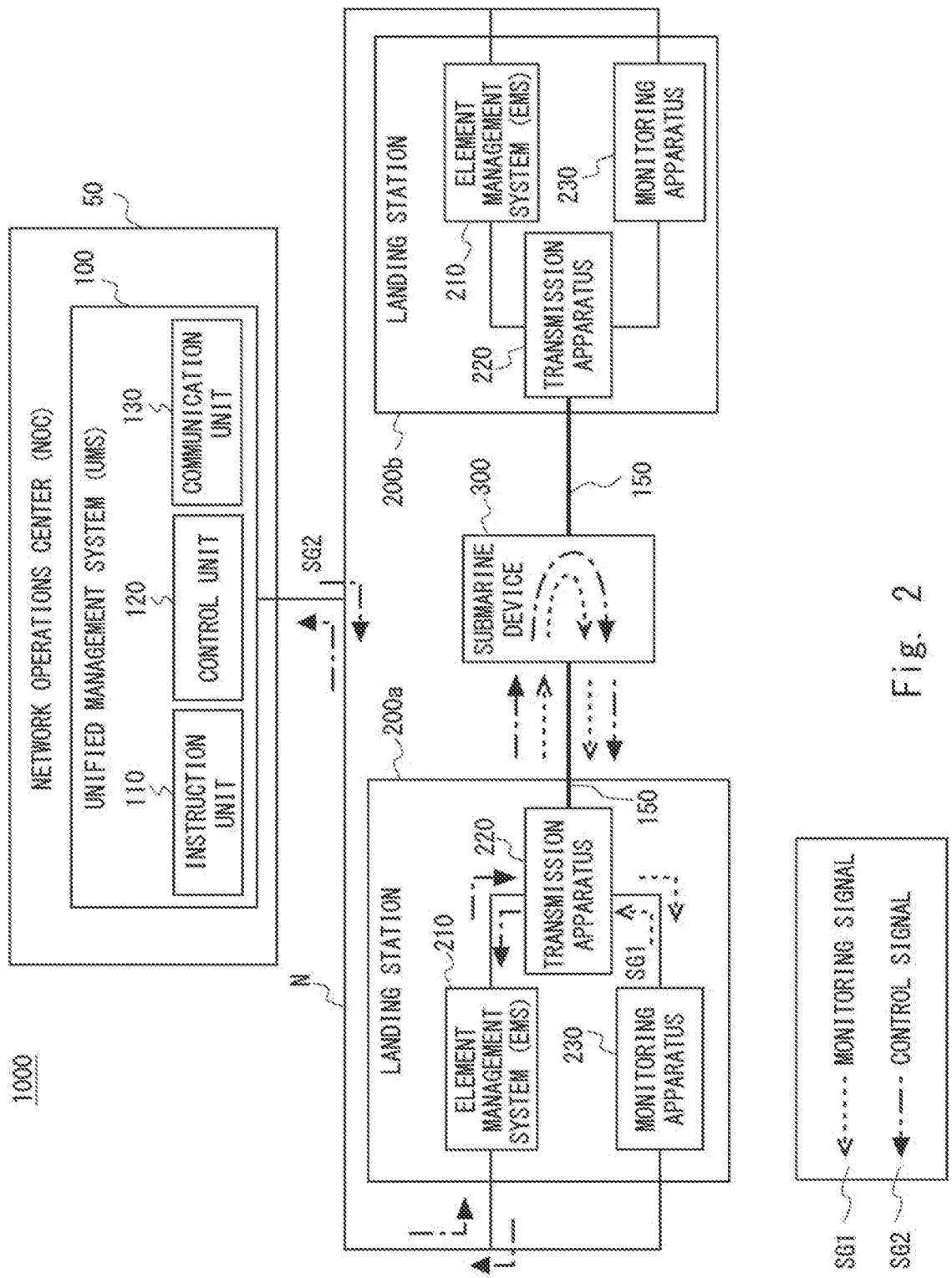
FIG. 2 is a block diagram showing a configuration of a monitoring control system according to a second example embodiment.
Figure 3:
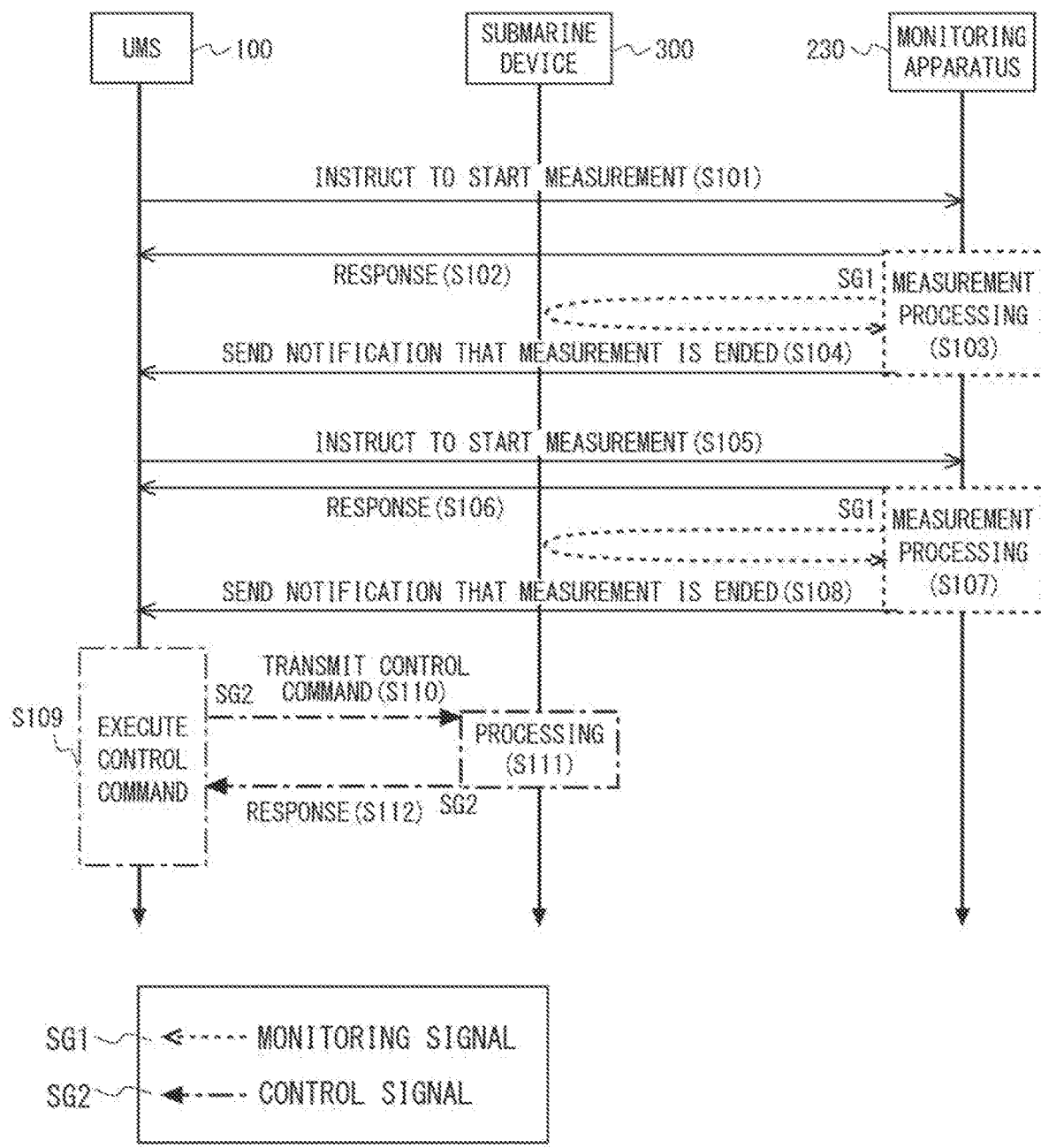
FIG. 3 is a sequence diagram showing normal measurement processing and control processing performed by the monitoring control system according to the second example embodiment.
Figure 4:
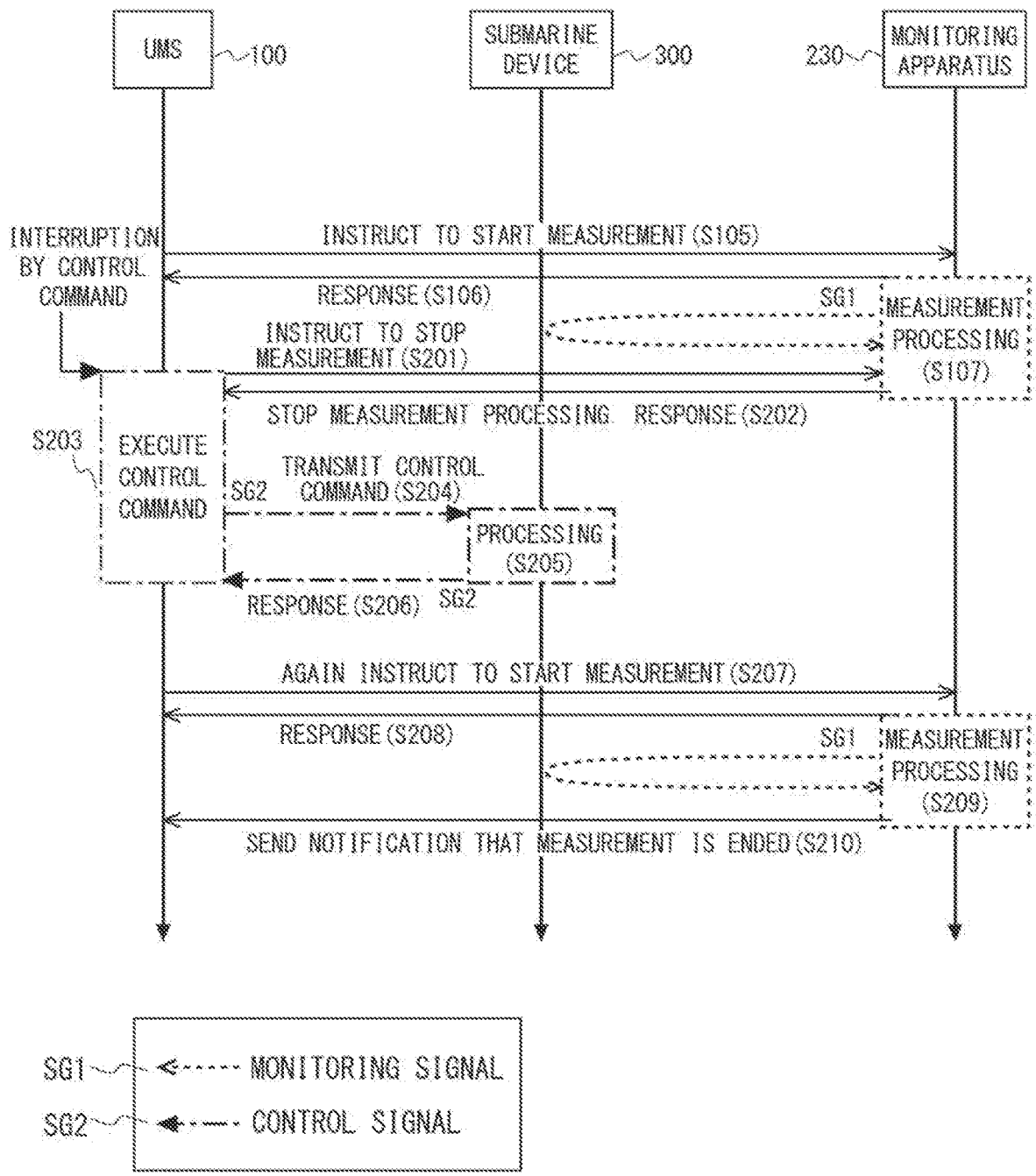
FIG. 4 is a sequence diagram showing measurement processing and control processing performed by the monitoring control system according to the second example embodiment in the case in which control processing interrupts measurement processing in the middle of the measurement processing.

FIG. 2 is a block diagram showing a configuration of a monitoring control system 1000 according to this example embodiment. The monitoring control system 1000 includes a Network Operations Center (NOC) 50, a landing station 200a, a landing station 200b, and a submarine device 300.
The NOC 50 has a function of controlling the monitoring control system 1000. The NOC 50 includes a Unified Management System (UMS) 100. The UMS 100 is connected to an Element Management System (EMS) 210 and a monitoring apparatus 230 provided in each of the landing stations 200a and 200b through a monitoring control network N, and performs communication with each other. The monitoring control network N may be a dedicated wired communication line. Alternatively, the monitoring control network N may be partially comprised of a wireless communication line, a cloud network, or the like.
The landing stations 200a and 200b are installed on the ground. Both of the landing stations 200a and 200b communicate with the UMS 100 through the monitoring control network N. Further, the landing stations 200a and 200b are connected to a submarine cable 150 and communicate with the submarine device 300 through the submarine cable 150. Note that, although the following description will be given using two landing stations 200a and 200b, the number of landing stations is not limited to two. Further, two or more submarine devices 300 may be provided in accordance with the number of landing stations.
The submarine device 300 is installed at the bottom of the sea. The submarine device 300 communicates with the landing stations 200a and 200b through the submarine cable 150. The submarine device 300 operates in accordance with the control performed by a control unit 120 of the UMS 100. The submarine device 300 may be, for example, a repeater or a branching apparatus.
The submarine cable 150 is laid at the bottom of the sea so that it connects the submarine device 300 to the landing station 200a and connects the submarine device 300 to the landing station 200b. The submarine cable 150 includes an optical fiber which is a transmission line of an optical signal. The submarine cable 150 transmits a monitoring signal SG1, a control signal SG2, and a main signal SG10.
In FIGS. 2 to 4, a flow of the monitoring signal SG1 is indicated by a broken line, and a flow of the control signal SG2 is indicated by an alternate long and short dashed line, as shown in the legend in each of the figures. Further, in FIGS. 2 to 4, the monitoring signal SG1 and the control signal SG2 may be shown without reference symbols being attached thereto. In FIGS. 2 to 4, each of the arrows clearly indicates a flow of the monitoring signal SG1 or the control signal SG2, and does not eliminate the bidirectionality of information. Note that a flow of the main signal SG10 and a flow of an instruction signal which will be described later are not shown in the figures.

The monitoring signal SG1 is a signal for monitoring a failure status of the submarine cable 150. The monitoring signal SG1 is used in the monitoring processing performed by the monitoring apparatus 230. The monitoring signal SG1 is sent from the monitoring apparatus 230 into the submarine cable 150 through a transmission apparatus 220 and reaches the submarine device 300.

The control signal SG2 is a signal including a control command to control the submarine device 300. The control signal SG2 is used in the control processing performed by the control unit 120. The control signal SG2 is sent from the control unit 120 into the submarine cable 150 through a communication unit 130, the EMS 210, and the transmission apparatus 220, and reaches the submarine device 300.

The main signal SG10 is a signal used to transmit traffic in the monitoring control system 1000. The main signal SG10 may be, for example, image data or audio data used for a service provided to a user. The main signal SG10 may be transmitted from the UMS 100, the landing station 200a, or the landing station 200b.

Figure 5:
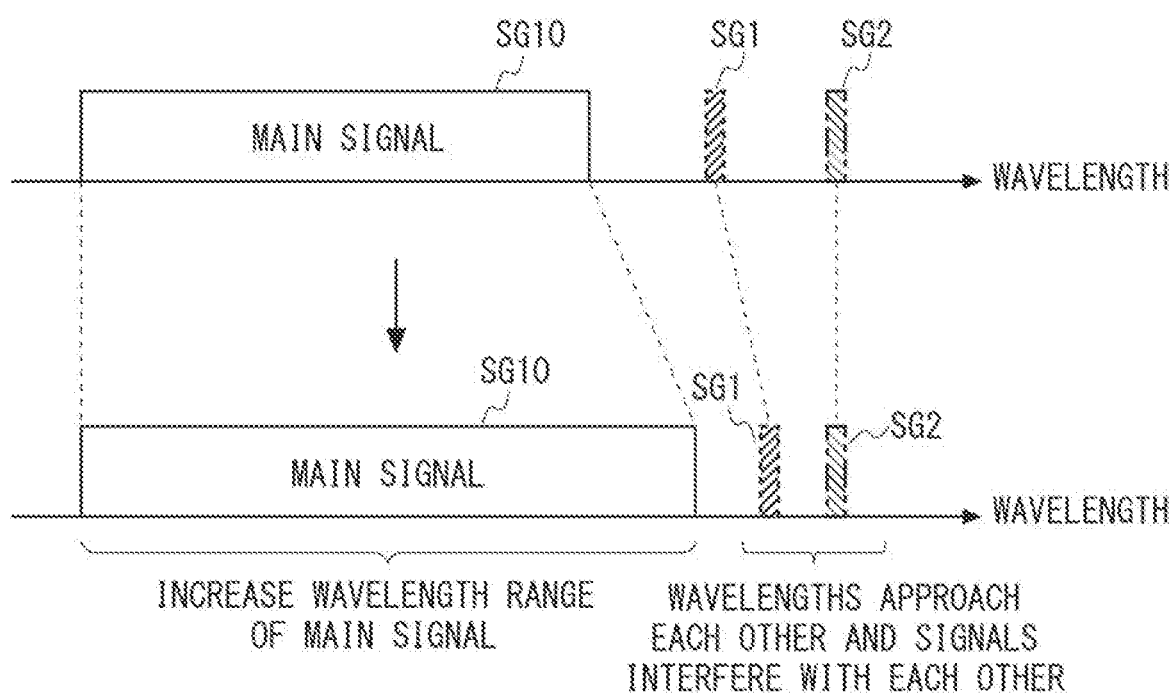
FIG. 5 is a diagram schematically showing a wavelength range of each of signals used in the monitoring control system according to the second example embodiment.

FIG. 5 is a diagram schematically showing a wavelength range of each of signals used in the monitoring control system 1000. As shown in FIG. 5, wavelength ranges of the monitoring signal SG1, the control signal SG2, and the main signal SG10 differ from each other. For example, assume a case in which the transmission capacity of the main signal SG10 is increased for a service provided to a user. In this case, as shown from the upper part of FIG. 5 to the lower part thereof, it is considered that the wavelength range of the main signal SG10 can be made to increase. However, the wavelength range of the main signal SG10 is limited. Thus, when the wavelength range of the main signal SG10 is increased, the wavelengths used for the monitoring signal SG1 and the control signal SG2 have to be arranged at closer wavelength intervals.

When the monitoring signal SG1 and the control signal SG2 of adjacent wavelengths are simultaneously transmitted into the submarine cable 150, they may interfere with each other and affect the function of controlling the submarine device 300 and the function of monitoring a failure of the submarine cable 150. However, in this example embodiment, since the monitoring signal SG1 and the control signal SG2 are sent into the submarine cable 150 at timings different from each other as described below, the monitoring signal SG1 and the control signal SG2 may have adjacent wavelengths.

Referring back to FIG. 2, the configurations of the landing stations 200a and 200b will be described. Since the configurations of the landing stations 200a and 200b are similar to each other, the description will be given below using the landing station 200a. As shown in FIG. 2, the landing station 200a includes the EMS 210, the transmission apparatus 220, and the monitoring apparatus 230.

The EMS 210 is connected to the UMS 100 through the monitoring control network N. The EMS 210 communicates with the control unit 120 through the communication unit 130. The EMS 210 receives the control signal SG2 from the control unit 120 and outputs the received control signal SG2 to the transmission apparatus 220. Further, the EMS 210 receives the control signal SG2 from the transmission apparatus 220 and transmits the received control signal SG2 to the control unit 120. Further, the EMS 210 has a function of performing a monitoring control of the transmission apparatus 220.

The transmission apparatus 220 communicates with the submarine device 300 through the submarine cable 150. The transmission apparatus 220 receives the control signal SG2 from the EMS 210, performs electrical/optical conversion of the control signal SG2, and sends the converted control signal SG2 into the submarine cable 150. The transmission apparatus 220 receives the control signal SG2 sent back from the submarine device 300, performs optical/electrical conversion of the control signal SG2, and outputs the converted control signal SG2 to the EMS 210.

The transmission apparatus 220 also receives the monitoring signal SG1 from the monitoring apparatus 230, performs electrical/optical conversion of the monitoring signal SG1, and sends the converted monitoring signal SG1 into the submarine cable 150. The transmission apparatus 220 receives the monitoring signal SG1 sent back from the submarine device 300, performs optical/electrical conversion of the monitoring signal SG1, and outputs the converted monitoring signal SG1 to the monitoring apparatus 230.

The monitoring apparatus 230 performs monitoring processing for monitoring a failure status of the submarine cable 150 in accordance with an instruction given by an instruction unit 110 of the UMS 100. The monitoring apparatus 230 receives an instruction signal transmitted from the instruction unit 110 and starts monitoring processing in accordance with the instruction signal.

Note that the instruction signal is a signal for the instruction unit 110 to instruct the monitoring apparatus 230 to start or stop monitoring processing. The stopping of monitoring processing means an interrupting of ongoing monitoring processing. The stopping of monitoring processing may be a temporary stopping or a complete stopping of monitoring processing. Note that the instruction signal may be an electrical signal different from the monitoring signal SG1, the control signal SG2, and the main signal SG10.

Further, the monitoring apparatus 230 may resume the stopped monitoring processing in accordance with an instruction signal sent from the instruction unit 110. The monitoring apparatus 230 may resume the interrupted monitoring processing at the point at which the monitoring was interrupted or may start the monitoring processing from the beginning thereof.

The processing for monitoring the submarine cable 150 performed by the monitoring apparatus 230 will be described in detail below. When the monitoring apparatus 230 receives an instruction signal sent from the instruction unit 110, the monitoring apparatus 230 sends the monitoring signal SG1 into the submarine cable 150 through the transmission apparatus 220. The monitoring signal SG1 travels through the submarine cable 150 from the monitoring apparatus 230 toward the submarine device 300. The monitoring signal SG1 is then looped back by the submarine device 300 and travels in a direction opposite to the traveling direction from the monitoring apparatus 230 to the submarine device 300. The monitoring signal SG1 then returns from the submarine device 300 to the monitoring apparatus 230 from which the monitoring signal SG1 was sent.

The monitoring apparatus 230 analyzes the monitoring signal SG1 that is looped back by the submarine device 300 and returned. The monitoring apparatus 230 detects that a failure has occurred in the submarine cable 150 based on a result of the analysis. For example, the monitoring apparatus 230 measures a transmission loss in the submarine cable 150 based on the result of the analysis of the monitoring signal SG1, and determines that a failure has occurred when the measured transmission loss exceeds a predetermined value. The monitoring apparatus 230, for example, specifies the time at which the failure occurred, a failure mode indicating the contents of the failure, and a place in the cable where the failure occurred.

The monitoring apparatus 230 repeatedly executes the above monitoring processing, thereby achieving a constant failure monitoring of the submarine cable 150. Note that the monitoring apparatus 230 may detect not only a failure that has occurred on a path of the submarine cable 150, but also a failure that has occurred in the submarine device 300 and the like. Further, the monitoring apparatus 230 may store information about a result of the monitoring processing and a failure in a storage unit (not shown), or may transmit the aforementioned information to the UMS 100.

Next, a configuration of the UMS 100 will be described.

The UMS 100 is a control apparatus that provides a monitoring control function throughout the monitoring control system 1000. The UMS 100 communicates with the landing stations 200a and 200b through the monitoring control network N. Since the configurations of the landing stations 200a and 200b are similar to each other, the description will be given below using the landing station 200a.

The UMS 100 includes the instruction unit 110, the control unit 120, and the communication unit 130.

The instruction unit 110 corresponds to the instruction unit 11 according to the first example embodiment. The instruction unit 110 instructs the monitoring apparatus 230 to perform processing for monitoring the submarine cable 150. Specifically, the instruction unit 110 transmits, to the monitoring apparatus 230, an instruction signal for instructing the monitoring apparatus 230 to start or stop monitoring processing through the monitoring control network N.

The instruction unit 110 may instruct the monitoring apparatus 230 to stop the monitoring processing before the end of the monitoring processing. The end of the monitoring processing means, for example, that a predetermined monitoring processing is successfully ended. Further, the instruction unit 110 instructs the monitoring apparatus 230 to stop the monitoring processing, and then receives a response signal from the submarine device 300 and detects that the control of the submarine device 300 is ended. The instruction unit 110 may detect that the control of the submarine device 300 is ended, and then again instruct the monitoring apparatus 230 to perform the monitoring processing.

The control unit 120 corresponds to the control unit 12 according to the first example embodiment. The control unit 120 controls the submarine device 300 using the control signal SG2. The control unit 120 transmits the control signal SG2 to the submarine device 300 through the landing station 200a and the submarine cable 150.

The control of the submarine device 300 performed by the control unit 120 will be described in detail below. First, the control unit 120 issues a control command to control the submarine device 300. The control unit 120 outputs the issued control command as the control signal SG2 to the communication unit 130. The communication unit 130 transmits the control signal SG2 to the EMS 210 through the monitoring control network N. The EMS 210 outputs the control signal SG2 to the transmission apparatus 220.

The transmission apparatus 220 receives the control signal SG2 and performs electrical/optical conversion of the control signal SG2. The transmission apparatus 220 sends the converted control signal SG2 into the submarine cable 150. The control signal SG2 is transmitted through the submarine cable 150 and reaches the submarine device 300. The submarine device 300 receives the control signal SG2.

The submarine device 300 performs predetermined processing in accordance with the control command included in the control signal SG2. The predetermined processing may be any processing, such as starting, stopping, or observing various types of sensors for submarine observation. When the submarine device 300 has ended the predetermined processing, the submarine device 300 transmits a response signal to the control unit 120 to notify the control unit 120 of the end of the processing.

The response signal travels a path opposite in direction to the path in which the control signal SG2 reaches the submarine device 300 from the control unit 120. The response signal reaches the control unit 120 from the submarine device 300 via the transmission apparatus 220, the EMS 210, and the communication unit 130. In this way, the processing for controlling the submarine device 300 performed by the control unit 120 is ended.

The control unit 120 can perform the above-described control processing at any timing. For example, the control unit 120 may detect the timing at which the monitoring processing performed by the monitoring apparatus 230 is not being executed, and then send the control signal SG2 into the submarine cable 150 and control the submarine device 300.

Further, the control unit 120 may detect the end of the monitoring processing by receiving a notification that the monitoring processing is ended from the monitoring apparatus 230, and then control the submarine device 300. That is, the control unit 120 may detect the timing at which the monitoring processing is not being executed by receiving a notification that the monitoring processing is ended.

Further, when the monitoring processing is stopped by an instruction given by the instruction unit 110 to the monitoring apparatus 230 before the end of the monitoring processing, the control unit 120 may control the submarine device 300 in response to the stopping of the monitoring processing. The control unit 120 may detect the stopping of the monitoring processing by receiving a notification that the monitoring processing is stopped from the monitoring apparatus 230, and control the submarine device 300 accordingly. That is, the control unit 120 may detect the timing at which the monitoring processing is not being executed by receiving a notification that the monitoring processing is stopped.

The communication unit 130 communicates with the landing station 200a through the monitoring control network N. The communication unit 130 receives an instruction signal from the instruction unit 110 and transmits it to the monitoring apparatus 230. Further, the communication unit 130 receives the control signal SG2 from the control unit 120 and transmits it to the EMS 210. Further, the communication unit 130 receives a response signal transmitted from the monitoring apparatus 230 or the submarine device 300 and outputs it to the instruction unit 110 or the control unit 120. Further, the communication unit 130 may transmit the main signal SG10 and various other signals to the landing station 200a.

Note that the configuration of the monitoring control system 1000 described with reference to FIG. 2 is merely an example. The monitoring control system 1000 may be configured using an apparatus in which a plurality of components are integrated or the like. For example, the functions of the UMS 100 and those of the landing station 200a or 200b may be integrated in the same apparatus. Further, the functional units of the UMS 100, the landing station 200a, and the landing station 200b may be implemented in a distributed manner using a plurality of apparatuses or the like.

Next, processing performed by the monitoring control system 1000 will be described with reference to FIGS. 3 and 4. Each of FIGS. 3 and 4 is a sequence diagram showing processing performed among the UMS 100, the landing station 200a, and the submarine device 300. A description will be given below in accordance with assumption that monitoring processing performed by the submarine device 300 is measurement processing for measuring a transmission loss of the submarine cable 150.

FIG. 3 shows a flow of normal measurement processing (monitoring processing) and control processing. In FIG. 3, after the measurement processing is successfully ended, the UMS 100 receives a notification that the measurement processing is ended from the monitoring apparatus 230 and starts the control processing. Further, FIG. 4 shows a flow of measurement processing and control processing in the case in which control processing interrupts measurement processing in the middle of the measurement processing. In FIG. 4, after the start of measurement processing, the monitoring apparatus 230 stops the measurement processing in response to the interruption by the control processing. Further, after the end of the control processing, the monitoring apparatus 230 resumes the measurement processing in accordance with an instruction given by the UMS 100.

As described above, communication between the UMS 100 and the submarine device 300 is performed via the EMS 210 and the transmission apparatus 220. Further, communication between the monitoring apparatus 230 and the submarine device 300 is performed via the transmission apparatus 220. However, in the description of FIGS. 3 and 4 and the following description, the EMS 210 and the transmission apparatus 220 will be omitted.

First, a flow of normal measurement processing and control processing will be described with reference to the sequence diagram shown in FIG. 3. The UMS 100 establishes a connection with the monitoring apparatus 230. The UMS 100 (the instruction unit 110) instructs the monitoring apparatus 230 to start measurement (S101). The monitoring apparatus 230 transmits a response signal to the UMS 100 (S102).

The monitoring apparatus 230 performs measurement processing using the monitoring signal SG1 in accordance with the instruction given by the UMS 100 (S103). For example, the monitoring apparatus 230 transmits the monitoring signal SG1 into the submarine cable 150 toward the submarine device 300. The monitoring apparatus 230 analyzes the monitoring signal SG1 looped back from the submarine device 300. The monitoring apparatus 230 measures a loss distribution in the submarine cable 150 based on a result of the analysis. The monitoring apparatus 230 detects that a failure has occurred in the submarine cable 150 based on a result of the measurement. The monitoring apparatus 230, for example, specifies the time at which the failure occurred, a failure mode, and a place in the cable where the failure occurred. The monitoring apparatus 230 may store the result of the measurement and the like in a storage unit or transmit them to the UMS 100.

When the measurement processing is completed, the monitoring apparatus 230 transmits a notification that the measurement is ended to the UMS 100 (S104). In this way, the measurement processing is successfully ended.

The UMS 100 instructs the monitoring apparatus 230 to start the next measurement processing (S105). Like in the case of the above-described processing, the monitoring apparatus 230 transmits a response signal to the UMS 100 (S106) and starts measurement processing (S107). When the measurement processing is completed, the monitoring apparatus 230 transmits a notification that the measurement is ended to the UMS 100 (S108). By repeatedly executing the above measurement processing, the monitoring apparatus 230 can achieve a constant failure monitoring of the submarine cable 150.

Further, the UMS 100 (the control unit 120) executes a predetermined control command to control the submarine device 300 in response to receiving the notification that the measurement is ended from the monitoring apparatus 230 (S109). Specifically, the UMS 100 issues a control command to control the submarine device 300 and transmits it to the submarine device 300 as the control signal SG2 (S110). Note that the monitoring signal SG1 and the control signal SG2 may be signals of adjacent wavelengths. The adjacent wavelengths may be, for example, wavelengths close enough to each other to cause an effect such as attenuation of the signals when the signals are simultaneously sent to the submarine cable 150.

The submarine device 300 receives the control signal SG2 and executes predetermined processing in accordance with the control command (S111). When the submarine device 300 has ended the predetermined processing, the submarine device 300 sends a response indicating that the predetermined processing is ended to the UMS 100 (S112). As described above, by performing the processing for controlling the submarine device 300 after the UMS 100 receives a notification that the measurement is ended from the monitoring apparatus 230, the measurement processing and the control processing can be performed at timings different from each other. Therefore, the monitoring processing and the control processing can be performed without causing the monitoring signal SG1 and the control signal SG2 to interfere with each other in the submarine cable 150.

Next, a flow of processing in the case in which measurement processing is stopped in response to the interruption by control processing from the UMS 100 after the start of normal measurement processing, and the measurement processing is started again after the control processing is ended will be described with reference to the sequence diagram shown in FIG. 4.

In the description with reference to FIG. 3, when the measurement processing in Step S107 is ended, the monitoring apparatus 230 transmits a notification that the measurement is ended to the UMS 100 (S108), and the UMS 100 executes a control command accordingly (S109). In this example, before the UMS 100 (the control unit 120) receives a notification that the measurement is ended from the monitoring apparatus 230, the UMS 100 controls the submarine device 300 by interrupting the measurement processing being executed.

The processing of Steps S105 and S106 shown in FIG. 4 is similar to that of Steps S105 and S106 shown in FIG. 3. That is, the UMS 100 (the instruction unit 110) instructs the monitoring apparatus 230 to start the measurement processing (S105), and the monitoring apparatus 230 transmits a response signal to the UMS 100 (S106). The monitoring apparatus 230 performs the measurement processing in a manner similar to that by which Step S107 shown in FIG. 3 is performed; however, in this example, the measurement processing is in the middle of the execution thereof (S107).

The UMS 100 (the instruction unit 110) instructs the monitoring apparatus 230 to stop measurement processing prior to issuing a control command to control the submarine device 300 (S201). Specifically, the UMS 100 transmits an instruction signal for instructing the monitoring apparatus 230 to stop the measurement processing. The stopping of the monitoring processing may be a temporary stopping or a complete stop of the monitoring processing.

The monitoring apparatus 230 stops the measurement processing in accordance with the instruction given by the UMS 100 and sends a response indicating that the measurement processing is stopped to the UMS 100 (S202). In response to the stopping of the measurement processing, the sending of the monitoring signal SG1 into the submarine cable 150 is stopped. In this way, the UMS 100 can perform the interruption by the control command to control the submarine device 300.

When the UMS 100 receives a response indicating that the measurement processing is stopped from the monitoring apparatus 230, it executes a control command to control the submarine device 300 (S203). Specifically, the UMS 100 issues a control command to control the submarine device 300 and transmits it to the submarine device 300 as the control signal SG2 (S204).

The submarine device 300 receives the control signal SG2 and executes predetermined processing in accordance with the control command (S205). When the submarine device 300 has ended the predetermined processing, the submarine device 300 sends a response indicating that the processing is ended to the UMS 100 (S206).

When the UMS 100 (the instruction unit 110) receives the response from the submarine device 300, the UMS 100 again instructs the monitoring apparatus 230 to start the measurement processing stopped in the processing in Step S202 (S207). The UMS 100 transmits an instruction signal indicating that the measurement processing is to be resumed to the submarine device 300. The monitoring apparatus 230 responds to the instruction signal (S208) and starts the stopped measurement processing again (S209). The monitoring apparatus 230 again performs the measurement processing using the monitoring signal SG1, and when the monitoring apparatus 230 has ended the measurement processing, it transmits a notification that the measurement is ended to the UMS 100 (S210). Note that, in this case, the stopped measurement processing may be resumed at the point at which the measurement was stopped, or new measurement processing may be started.

Note that, although processing in which the UMS 100 interrupts the monitoring processing of the submarine device 300 by the control processing in the middle of the measurement processing has been described above, the present disclosure is not limited thereto. When the UMS 100 detects that the measurement processing is in the middle of the execution thereof when it is about to start performing the control processing, the UMS 100 may wait for the timing at which the monitoring processing is ended and then start the control processing. Further, the UMS 100 may set the timing at which the measurement processing is started and ended in advance and instruct the submarine device 300 to follow the execution schedule of the measurement processing.

As described above, in the monitoring control system 1000 according to this example embodiment, the UMS 100 receives a notification that monitoring processing is ended from the monitoring apparatus 230. Further, when the monitoring processing is being executed, the UMS 100 instructs the monitoring apparatus 230 to stop the monitoring processing, and receives a notification that the monitoring processing is stopped from the monitoring apparatus 230. The UMS 100 can detect the timing at which the monitoring processing is not being executed by receiving a notification that the monitoring processing is ended or stopped, and perform processing for controlling the submarine device 300 after the detection of the timing.

By doing the above, it is possible to avoid the monitoring signal SG1 used by the monitoring apparatus 230 and the control signal SG2 used by the UMS 100 from being sent simultaneously into the submarine cable 150. Therefore, even when the wavelength of the control signal SG1 and the wavelength of the control signal SG2 are adjacent to each other, control processing and monitoring processing can be appropriately performed without causing the signals to interfere with each other.

<Example of Hardware Configuration>

Each functional components of the UMS 100, the landing stations 200a and 200b, and the submarine device 300 may be implemented by hardware (e.g., a hard-wired electronic circuit) that implements the functional components, or by a combination of hardware and software (e.g., a combination of an electronic circuit and a program for controlling the electronic circuit). A case in which each functional component of the UMS 100 and the like is implemented by a combination of hardware and software will be described below.

Figure 6:
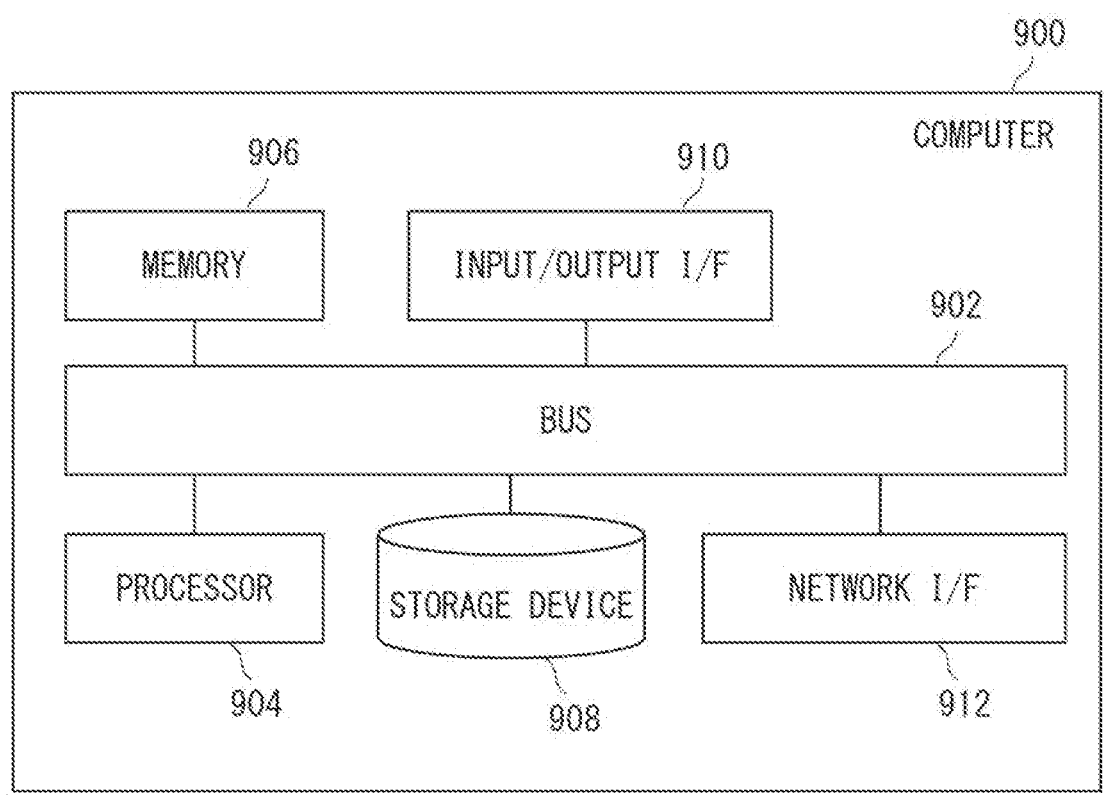
FIG. 6 is a block diagram showing an example of a hardware configuration.

FIG. 6 is a block diagram illustrating a hardware configuration of a computer 900 that implements the UMS 100 and the like. The computer 900 may be a dedicated computer designed to implement the UMS 100 and the like, or may be a general-purpose computer. The computer 900 may be a portable computer such as a smartphone or a tablet terminal.

For example, by installing a predetermined application in the computer 900, each function of the UMS 100 and the like is implemented by the computer 900. The above application comprises a program for implementing each functional component of the UMS 100 and the like.

The computer 900 includes a bus 902, a processor 904, a memory 906, a storage device 908, an input/output interface 910, and a network interface 912. The bus 902 is a data transmission path through which the processor 904, the memory 906, the storage device 908, the input/output interface 910, the network interface 912 transmit and receive data to and from each other. However, a method for connecting the processor 904 and the like to each other is not limited to the method for connecting these to each other by the bus.

The processor 904 may be any of various types of processors such as a Central Processing Unit (CPU), a Graphics Processing Unit (GPU), or a Field-Programmable Gate Array (FPGA). The memory 906 is a main storage device implemented by using a Random Access Memory (RAM) or the like. The storage device 908 is an auxiliary storage device implemented by using a hard disk, a Solid State Drive (SSD), a memory card, or a Read Only Memory (ROM), or the like.

The input/output interface 910 is an interface for connecting the computer 900 to an input/output device(s). For example, an input device such as keyboard and an output device such as display apparatus are connected to the input/output interface 910.

The network interface 912 is an interface for connecting the computer 900 to a network. The network may be a Local Area Network (LAN) or a Wide Area Network (WAN).

The storage device 908 stores a program(s) for implementing each functional component of the UMS 100 and the like (a program for implementing the above-described application). The processor 904 loads the program(s) into the memory 906 and executes it, thereby implementing each functional component of the UMS 100 and the like.

Each processor executes one or a plurality of programs including instructions for causing a computer to perform the algorithm described with reference to the drawings. The program(s) includes instructions (or software codes) that, when loaded into a computer, cause the computer to perform one or more of the functions described in the example embodiments. The program(s) may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (Registered Trademark) disc or other types of optical disc storage, and magnetic cassettes, magnetic tape, magnetic disk storage or other types of magnetic storage devices. The program(s) may be transmitted on a transitory computer readable medium or a communication medium. By way of example, and not a limitation, transitory computer readable media or communication media can include electrical, optical, acoustical, or other forms of propagated signals. Note that the present disclosure is not limited to the above-described example embodiments and may be changed as appropriate without departing from the scope and spirit of the present disclosure.

The whole or part of the example embodiments disclosed above can be described as, but not limited to, the following supplementary notes.

(Supplementary Note 1)

A control apparatus comprising:
  instruction means for instructing a monitoring apparatus to perform processing for monitoring a submarine cable; and
  control means for controlling a submarine device connected to the submarine cable, wherein
  the monitoring apparatus, in response to the instruction given by the instruction means, sends a monitoring signal into the submarine cable and performs the monitoring processing, and
  the control means detects a timing at which the monitoring processing is not being executed, and then sends a control signal into the submarine cable and controls the submarine device.

(Supplementary Note 2)

The control apparatus according to supplementary note 1, wherein the control means controls the submarine device in response to receiving a notification that the monitoring processing is ended from the monitoring apparatus.

(Supplementary Note 3)

The control apparatus according to supplementary note 1 or 2, wherein the control means controls the submarine device in response to a stopping of the monitoring processing before an end of the monitoring processing.

(Supplementary Note 4)

The control apparatus according to any one of supplementary notes 1 to 3, wherein
  the instruction means instructs the monitoring apparatus to stop the monitoring processing before the end of the monitoring processing, and
  the control means controls the submarine device in response to the stopping of the monitoring processing.

(Supplementary Note 5)

The control apparatus according to supplementary note 4, wherein the control means controls the submarine device in response to receiving a notification that the monitoring processing is stopped from the monitoring apparatus.

(Supplementary Note 6)

The control apparatus according to supplementary note 4 or 5, wherein the instruction means instructs the monitoring apparatus to stop the monitoring processing, and then again instructs the monitoring apparatus to perform the monitoring processing in response to the end of the control of the submarine device.

(Supplementary Note 7)

The control apparatus according to any one of supplementary notes 1 to 6, wherein the monitoring apparatus sends the monitoring signal toward the submarine device and monitors a failure status of the submarine cable based on the monitoring signal looped back by the submarine device.

(Supplementary Note 8)

A control system comprising:
  a monitoring apparatus; and
  a control apparatus, wherein
  the control apparatus comprises:
    instruction means for instructing the monitoring apparatus to perform processing for monitoring a submarine cable; and
    control means for controlling a submarine device connected to the submarine cable,
  the monitoring apparatus, in response to the instruction given by the instruction means, sends a monitoring signal into the submarine cable and performs the monitoring processing, and
  the control means detects a timing at which the monitoring processing is not being executed, and then sends a control signal into the submarine cable and controls the submarine device.

(Supplementary Note 9)

The control system according to supplementary note 8, wherein the control means controls the submarine device in response to receiving a notification that the monitoring processing is ended from the monitoring apparatus.

(Supplementary Note 10)

A control method comprising:
  instructing a monitoring apparatus to perform processing for monitoring a submarine cable; and
  controlling a submarine device connected to the submarine cable, wherein
  the monitoring apparatus, in response to the instruction given to the monitoring apparatus, sends a monitoring signal into the submarine cable and performs the monitoring processing, and
  in the controlling of the submarine device, a timing at which the monitoring processing is not being executed is detected, and then a control signal is sent into the submarine cable and the submarine device is controlled.

(Supplementary Note 11)

A non-transitory computer readable medium storing a control program for causing a computer of a control apparatus to:
  instruct a monitoring apparatus to perform processing for monitoring a submarine cable; and
  control a submarine device connected to the submarine cable, wherein
  the monitoring apparatus, in response to the instruction given by the control apparatus, sends a monitoring signal into the submarine cable and performs the monitoring processing, and
  in the controlling of the submarine device, a timing at which the monitoring processing is not being executed is detected, and then a control signal is sent into the submarine cable and the submarine device is controlled.

REFERENCE SIGNS LIST

10 CONTROL APPARATUS
11 INSTRUCTION UNIT
12 CONTROL UNIT
50 NETWORK OPERATIONS CENTER (NOC)
100 UNIFIED MANAGEMENT SYSTEM (UMS)
110 INSTRUCTION UNIT

120 CONTROL UNIT
130 COMMUNICATION UNIT
150 SUBMARINE CABLE
200a, 200b LANDING STATION
210 ELEMENT MANAGEMENT SYSTEM (EMS)
220 TRANSMISSION APPARATUS
230 MONITORING APPARATUS
300 SUBMARINE DEVICE
900 COMPUTER
902 BUS
904 PROCESSOR
906 MEMORY
908 STORAGE DEVICE
910 INPUT/OUTPUT INTERFACE
912 NETWORK INTERFACE
1000 MONITORING CONTROL SYSTEM
N MONITORING CONTROL NETWORK
SG1 MONITORING SIGNAL
SG2 CONTROL SIGNAL
SG10 MAIN SIGNAL

What is claimed is:

1. A control apparatus comprising:
at least one memory storing instructions; and
at least one processor configured to execute the instructions to:
instruct a monitoring apparatus to perform processing for monitoring a submarine cable; and
control a submarine device connected to the submarine cable, wherein
the monitoring apparatus, in response to the instruction given by the control apparatus, sends a monitoring signal into the submarine cable and performs the monitoring processing, and
the at least one processor is configured to execute the instructions to
detect a timing at which the monitoring processing is not being executed, and then send a control signal into the submarine cable and control the submarine device.

2. The control apparatus according to claim 1, wherein the at least one processor is further configured to execute the instructions to control the submarine device in response to receiving a notification that the monitoring processing is ended from the monitoring apparatus.

3. The control apparatus according to claim 1, wherein the at least one processor is further configured to execute the instructions to control the submarine device in response to a stopping of the monitoring processing before an end of the monitoring processing.

4. The control apparatus according to claim 1, wherein the at least one processor is further configured to execute the instructions to:
instruct the monitoring apparatus to stop the monitoring processing before the end of the monitoring processing; and
control the submarine device in response to the stopping of the monitoring processing.

5. The control apparatus according to claim 4, wherein the at least one processor is further configured to execute the instructions to control the submarine device in response to receiving a notification that the monitoring processing is stopped from the monitoring apparatus.

6. The control apparatus according to claim 4, wherein the at least one processor is further configured to execute the instructions to instruct the monitoring apparatus to stop the monitoring processing, and then again instruct the monitoring apparatus to perform the monitoring processing in response to the end of the control of the submarine device.

7. The control apparatus according to claim 1, wherein the monitoring apparatus sends the monitoring signal toward the submarine device and monitors a failure status of the submarine cable based on the monitoring signal looped back by the submarine device.

8. A control system comprising:
a monitoring apparatus; and
a control apparatus, wherein
the control apparatus comprises:
at least one memory storing instructions; and
at least one processor configured to execute the instructions to:
instruct the monitoring apparatus to perform processing for monitoring a submarine cable; and
control a submarine device connected to the submarine cable,
the monitoring apparatus, in response to the instruction given by the control apparatus, sends a monitoring signal into the submarine cable and performs the monitoring processing, and
the at least one processor is configured to execute the instructions to detect a timing at which the monitoring processing is not being executed, and then send a control signal into the submarine cable and control the submarine device.

9. The control system according to claim 8, wherein the at least one processor is further configured to execute the instructions to control the submarine device in response to receiving a notification that the monitoring processing is ended from the monitoring apparatus.

10. A control method comprising:
instructing a monitoring apparatus to perform processing for monitoring a
submarine cable; and
controlling a submarine device connected to the submarine cable, wherein
the monitoring apparatus, in response to the instruction given to the monitoring apparatus, sends a monitoring signal into the submarine cable and performs the monitoring processing, and
in the controlling of the submarine device, a timing at which the monitoring processing is not being executed is detected, and then a control signal is sent into the submarine cable and the submarine device is controlled.

* * * * *